Patented Oct. 16, 1928.

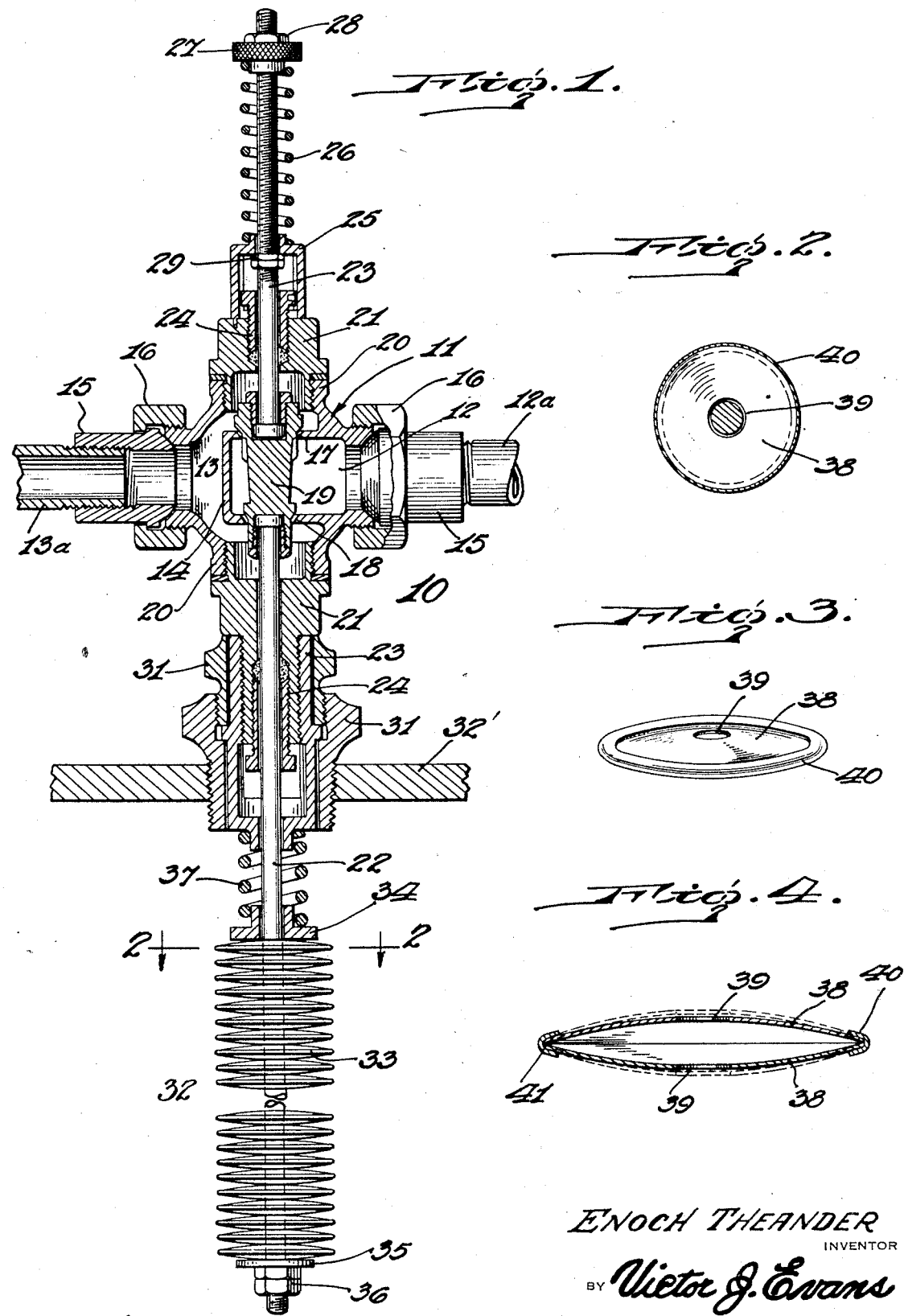

1,688,291

UNITED STATES PATENT OFFICE.

ENOCH THEANDER, OF BROOKLYN, NEW YORK.

TEMPERATURE CONTROLLER.

Application filed December 5, 1927. Serial No. 237,803.

This invention relates to improvements in what is generally known as temperature controllers for automatically maintaining a constant temperature in a liquid tank or other like heated chamber.

The primary object of the invention resides in a temperature controller in the form of a thermostatic valve in which the expanding element of the thermostat acts directly on the valve for preventing the possibility of any lost motion through intermediate working parts as are now used on valves of this kind.

Another object of the invention is to provide a thermostatic valve in which the thermostat is constructed of a plurality of expansion and contractible elements arranged side by side upon the valve stem, each of which is constructed of a pair of disks of an expansion and contractible material while their edges are bound by a ring of non-expanding or contracting material for restraining lineal expansion or contraction of the disks, thus causing them to bulge outwardly and recede according to the temperature to which they are subjected.

Another object of the invention is the provision of a thermal element which is simple of construction, inexpensive of manufacture, and which may be directly applied to the part to be actuated and controlled thereby.

With these and other objects in view, the invention resides in certain novel construction and arrangement of parts, the essential features of which are hereinafter fully described, are particularly pointed out in the appended claims, and are illustrated in the accompanying drawing, in which:—

Figure 1 is a vertical longitudinal sectional view through my improved thermostatic valve.

Figure 2 is a transverse sectional view on the line 2—2 of Figure 1.

Figure 3 is a detail perspective view through one of the thermal elements per se.

Figure 4 is an enlarged vertical sectional view through one of the thermal elements showing the disks expanded in dotted lines.

Referring more particularly to the drawing, the reference numeral 10 designates my improved thermostatic valve in its entirety which includes a globular casing 11 having diametrically opposed inlet and outlet passages 12 and 13 respectively, separated by a partition 14. The inlet and outlet passages are surrounded by threaded nipples 15 to which the inlet and outlet pipes 12ª and 13ª are connected by unions 16. The opposed walls of the partition 14 have valve seats 17 and 18 provided therein for providing passages between the inlet and exhaust passes to establish communication therebetween when the double valve 19 is unseated from the seats 17 and 18.

The valve casing 11 is also provided with oppositely disposed internally threaded nipples 20 which are arranged at right angle to the axis of the nipples 15 and which threadedly receive bonnets 21 through which an actuating rod 22 and a pull back stem 23 respectively are slidably mounted, while the inner ends of both the rod and stem are fixedly connected to the respective ends of the double valve 19. Packing glands 24 are provided upon the bonnets for sealing the joints about said rod and stem.

Supported upon the bonnet 21 through which the pull back rod 23 extends, is a bracket 25 through which the said rod slidably passes and against which one end of an expansible spring 26 abuts. The other end of the spring abuts a manipulating nut 27 threaded to the outer end of the stem and by which the tension of the spring may be regulated. Lock nuts 28 are also threaded to the stem against the thumb nut 27 to maintain the same in a set position. Stop nuts 29 are also threadedly mounted on the stem for engagement with the end of the bracket for limiting the outward movement of the stem against the action of the spring 26, and which are adjusted so as to permit the spring to hold the valve 19 in a normally open position as shown in Figure 1 of the drawing.

Threaded to a reduced portion provided on the bonnet 21 through which the actuating rod 22 extends is a sleeve 23 having a bearing for slidably receiving the said rod and about which sleeve are suitable coacting tank fittings 31 by which the valve may be supported upon the wall 32' of a tank or the like.

The actuating rod extends well beyond the end of the sleeve 23 and into the interior of the tank and it is upon the projecting end of the rod to which the thermostatic unit is applied which embodies a plurality of identically constructed thermal elements 33 arranged one against the other and which are interposed between a collar 34 provided on said rod inward of the end thereof, and a washer 35 adjacent the free end thereof and which is held in an adjusted position by lock nuts 36 threaded to the rod. A safety expansion spring 37 surrounds the rod and is interposed between the end of the sleeve 23 and the collar 34 which tends to force the thermal elements outwardly toward the free end of the rod. The tension of the safety spring is greater than the tension on the spring 26 so as not to interfere with the normal open position of the double valve 19.

Each of the thermal elements comprises a pair of oppositely bowed disks 38 of an expanding and contracting material such as bronze or the like and which have aligned openings 39 therein for the passage of the rod 22 on which the elements are loosely mounted. A ring 40 encircles the peripheries of the disks and is constructed of a non-expanding metal such as iron nickel, alloy, known as "invar steel" which is non-expanding up to a temperature of 300 degrees C. Any number of these thermal elements may be mounted on the actuating rod depending upon the extent of movement desired and which movement is caused by the fact that the lineal expansion of the disks 38 is restrained by the non-expanding ring 40 spun about the peripheries thereof. The peripheries of the disks are bevelled as at 41 so that the ring may be firmly spun thereon. When heated, the expanding metal disks 38 will bulge outwardly due to their inability to increase in diameter. The bulging of one single thermal element produces but a slight movement but a plurality of these elements arranged as shown in the drawing co-act to produce a relatively large movement upon the actuating rod to close the valve 19 against the action of the spring 26.

In operation, the valve is mounted on the wall of a tank or the like with the thermal unit 32 extending therein and in which it is desired to keep the temperature under control. The stop nuts 29 are first adjusted to a position for limiting the open movement of the valve 19 while the adjusting nut 27 is moved to a position on the rod 23 to regulate the tension of the spring 26 to resist the closing of the valve against a pressure of a predetermined degree. It is presumed that a temperature is present within the tank of a degree sufficient to expand the thermal elements a distance to move the rod 22 to a closed position with a built up pressure capable of overcoming the tension on the spring 26. The thermal elements being prevented from lineal movement and from inward movement by the safety spring 37 will push outwardly against the washer 35 thus imparting sliding movement to the rod 22, valve 19 and stem 23 until the valve closes.

Upon further expansion, the safety spring 37 will yield as will be readily appreciated.

If desired, a reverse movement could be imparted to the actuating rod or part to be actuated, by rearranging the two metals in the thermal elements and springs. Although I prefer to make the individual thermal elements as illustrated in the drawings, it may in practice prove to be advantageous to alter certain details in construction to meet certain requirements, however, the principle of restraining normal linear expansion and contraction being strictly adhered to. In some cases, it might be found necessary to restrict the size of the thermostatic unit, whereupon the use of a lever arrangement between the same and the valve may be resorted to to multiply the movement of the unit.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a thermostatic valve having a slidable valve element normally held in an open position, a slidable actuating rod connected to said valve element, spaced stops mounted on said actuating rod, and a thermal unit mounted on said rod and interposed between said stops, said thermal unit including a plurality of separate thermal elements being restricted from lineal movement.

2. In a thermostatic valve having a slidable valve element normally held in an open position, a slidable actuating rod connected to said valve element, spaced stops mounted on said actuating rod, and a thermal unit mounted on said rod and interposed between said stops, said thermal unit including a plurality of separate thermal elements each embodying a pair of plates of expanding and contracting metal, and a metal band encircling the said plates and being of a non-expanding metal to restrict lineal movements of said pair of plates.

3. In a thermostatic valve having a slidable valve element, spring means for normally holding said valve element in an open position, a slidable actuating rod connected to said valve element, a yieldable collar slidable on said actuating rod and being under a tension greater than the tension of said spring means, a stop adjacent the end of said rod, individual thermal elements loosely mounted on said rod between said collar and stop, said thermal units being restricted from lineal movement but capable of axial expansion and contraction with respect to said rod whereupon the subjecting of said thermal elements to the action of heat will cause the axial expansion of the same to move said rod and valve element against the action of said spring means for closing said valve element.

4. In a thermostatic valve having a slidable valve element, spring means for normally holding said valve element in an open position, a slidable actuating rod connected to said valve element, a yieldable collar slidable on said actuating rod and being under a tension greater than the tension of said spring means, a stop adjacent the end of said rod, individual thermal elements loosely mounted on said rod between said collar and stop, said thermal units being restricted from lineal movement but capable of axial expansion and contraction with respect to said rod, whereupon the subjection of said thermal elements to the action of heat will cause the axial expansion of the same to move said rod and valve element against the action of said spring means for closing said valve element, and means for regulating the tension of said spring means to set the valve to automatically operate under a temperature of a predetermined degree of heat.

5. In a thermostatic valve, a slidable valve element, spring means normally holding said valve element in an open position, an actuating rod connected to said valve element, a pair of spaced stops mounted on said rod, one of said stops being slidable thereon, a plurality of thermal elements mounted on said rod between said stops and being capable of expansion and contraction axially of said rod, and a spring acting against said slidable stops and being of a tension greater than the tension of said spring means to facilitate of any further expansion of said thermal elements beyond that required to move said valve element to a closed position against the action of said spring means.

6. A thermal valve comprising a valve casing having a valve seat therein, a slidable valve element for co-action with said valve seat, a slidable rod extending from one end of said valve element, spring means acting upon said rod to normally hold said valve element away from said valve seat, adjustable stop means on said rod for limiting the movement of said valve rod by the action of said spring means, a slidable actuating rod connected to and extending from said valve element in axial alignment with said first slidable rod, spaced stops mounted on said actuating rod and a plurality of separate thermal elements mounted side by side on said actuating rod intermediate said stops and being restricted from lineal movement.

In testimony whereof I hereby affix my signature.

ENOCH THEANDER.